(12) United States Patent
Speers et al.

(10) Patent No.: US 8,036,945 B2
(45) Date of Patent: Oct. 11, 2011

(54) METHOD OF GENERATING PRODUCT CAGETORIES FROM A TEXT STRING

(75) Inventors: Robert Speers, Phoenix, AZ (US); Levente Batizy, Litchfield Park, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 311 days.

(21) Appl. No.: 12/239,626

(22) Filed: Sep. 26, 2008

(65) Prior Publication Data

US 2010/0082452 A1    Apr. 1, 2010

(51) Int. Cl.
*G06Q 30/00* (2006.01)
(52) U.S. Cl. ...................................... 705/26.1
(58) Field of Classification Search ............ 705/26, 705/27, 26.1; 706/45, 46, 47, 48
See application file for complete search history.

(56) References Cited

U.S. PATENT DOCUMENTS

| | | | |
|---|---|---|---|
| 5,848,396 A | 12/1998 | Gerace | |
| 6,185,551 B1 | 2/2001 | Birrell et al. | |
| 6,256,633 B1 | 7/2001 | Dharap | |
| 6,279,017 B1* | 8/2001 | Walker | 715/201 |
| 6,751,600 B1* | 6/2004 | Wolin | 706/12 |
| 7,668,821 B1* | 2/2010 | Donsbach et al. | 707/765 |
| 2001/0042050 A1 | 11/2001 | Fletcher et al. | |
| 2002/0143659 A1* | 10/2002 | Keezer et al. | 705/27 |
| 2003/0050863 A1 | 3/2003 | Radwin | |
| 2005/0114229 A1* | 5/2005 | Ackley et al. | 705/26 |
| 2007/0208679 A1* | 9/2007 | Tseng et al. | 706/45 |
| 2007/0214140 A1* | 9/2007 | Dom et al. | 707/7 |
| 2008/0046343 A1* | 2/2008 | Maguire et al. | 705/27 |
| 2008/0114644 A1* | 5/2008 | Frank et al. | 705/14 |

OTHER PUBLICATIONS

Bielenberg, K. and Zacher, M., Groups in Social Software: Utilizing Tagging to Integrate Individual Contexts for Social Navigation, Masters Thesis submitted to the Program of Digital Media, Universität Bremen (2006) http://bielenberg.info/thesis.pdf.*
Unpublished U.S. Appl. No. 12/239,658.
www.scribd.com "magneticone," "Tag Cloud for Your Online Store," Mar. 6, 2008.

* cited by examiner

*Primary Examiner* — Yogesh C Garg
*Assistant Examiner* — Matthew Zimmerman
(74) *Attorney, Agent, or Firm* — Chris A. Watt

(57) ABSTRACT

Methods of the present invention allow a static product category to be received from a user for a product on an ecommerce site. The user may then be enabled to dynamically associate the product with the static product category using a metadata tag.

16 Claims, 21 Drawing Sheets

---

Multiple Word Product Association – Browser http://

Welcome to the Hats, Shirts and Pants Emporium
You are logged in as: E-Commerce Merchant

You have associated the tag Pink Cowboy Hat with product Flamingo Ten Gallon Hat. The following list represents combinations of word "tokens" for this tag. Please select as tags the combinations which best describe the product.

- ☑ Pink
- ☑ Cowboy
- ☑ Hat
- ☑ Pink Cowboy
- ☑ Pink Hat
- ☑ Cowboy Hat
- ☑ Pink Cowboy Hat

[ UPDATE ASSOCIATIONS ]

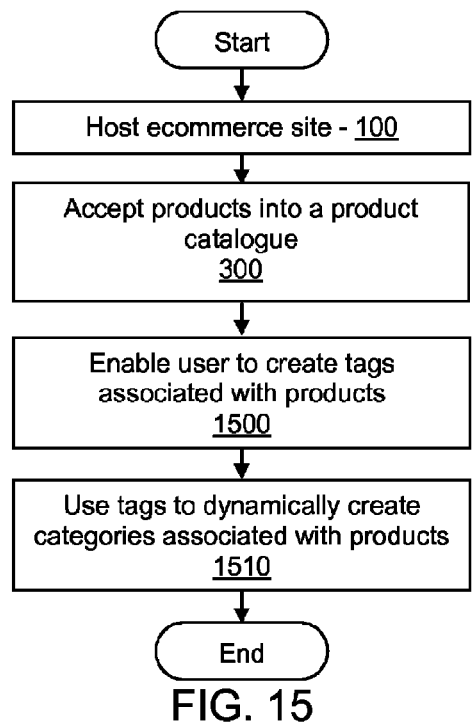

FIG. 15

Product Definition – Browser http://

Welcome to the Hats, Shirts and Pants Emporium
You are logged in as: E-Commerce Merchant

Please enter a new product for the catalog:   Flamingo Ten Gallon Hat

Please enter a description for the Flamingo Ten Gallon Hat:

The Flamingo Ten Gallon Hat is a stylish and functional Pink Cowboy Hat, designed to keep the user dry and in rain, or look good on sunny days, and sells for the reasonable price of $1,200.

UPDATE PRODUCT

FIG. 16

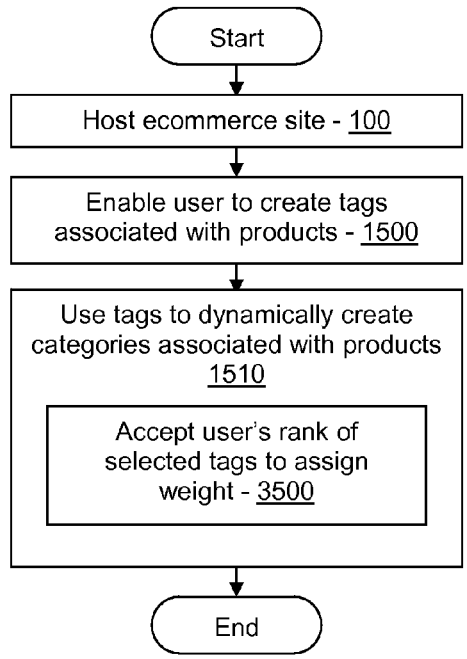

FIG. 35

Welcome to the Hats, Shirts and Pants Emporium
You are logged in as: E-Commerce Merchant

The following word tokens have been chosen as tags associated with product Flamingo Ten Gallon Hat. Please rank the tags to assign a weight to each - 1 as the highest rank will be assigned the greatest weight.

| [6] Pink | [7] Pink Cowboy | [1] Pink Cowboy Hat |
| [5] Cowboy | [3] Pink Hat | |
| [4] Hat | [2] Cowboy Hat | |

SUBMIT RANKING

FIG. 36

METHOD OF GENERATING PRODUCT CAGETORIES FROM A TEXT STRING

CROSS REFERENCE TO RELATED PATENT APPLICATIONS

This patent application is related to the following concurrently-filed patent applications:

U.S. patent application Ser. No. 12/239,658, "ASSOCIATING A PRODUCT WITH A DYNAMIC CATEGORY USING TAGS."

The subject matter of all patent applications is commonly owned and assigned to The Go Daddy Group, Inc. All prior applications are incorporated herein in their entirety by reference

FIELD OF THE INVENTION

The present inventions generally relate to the field of ecommerce and, more specifically, methods and systems for dynamically associating a product with a category in both a static category and dynamic category environment using metadata tags.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. Ecommerce (i.e., buying and selling products or services over electronic systems such as the Internet) is growing, with businesses delivering more services and content across the Internet, communicating and collaborating online, and inventing new ways to connect with each other.

SUMMARY OF THE INVENTION

The present invention provides methods and systems for dynamically associating a product with a category in both a static category and dynamic category environment using metadata tags, thus overcoming substantial limitations in the relevant art.

An exemplary method of dynamically associating a product with a category in a static category environment using metadata tags may comprise several steps including the step of hosting an ecommerce site on a hosting computer communicatively coupled to a network. A static product category may be received from a user for a product on the ecommerce site. The user may then be enabled to dynamically associate the product with the static product category using a metadata tag.

An exemplary method of dynamically associating a product with a category in a dynamic category environment using metadata tags may comprise several steps including the step of hosting an ecommerce site on a hosting computer communicatively coupled to a network. A user may be enabled to create a metadata tag associated with a product on the ecommerce site. Using the metadata tag, a product category associated with the product may be dynamically created.

The above features and advantages of the present invention will be better understood from the following detailed description taken in conjunction with the accompanying drawings.

BRIEF DESCRIPTION OF THE DRAWINGS

FIG. 15 is a flow diagram illustrating a possible embodiment of a method for dynamically associating a product with a category in a dynamic category environment using metadata tags.

FIG. 16 illustrates a possible embodiment of an interface for accepting products into a product catalog.

FIG. 35 is a flow diagram illustrating a possible embodiment including accepting a user's rank of selected tags to assign weight.

FIG. 36 illustrates a possible embodiment of an interface for accepting a user's rank of selected tags to assign weight.

DETAILED DESCRIPTION

Figure 1:
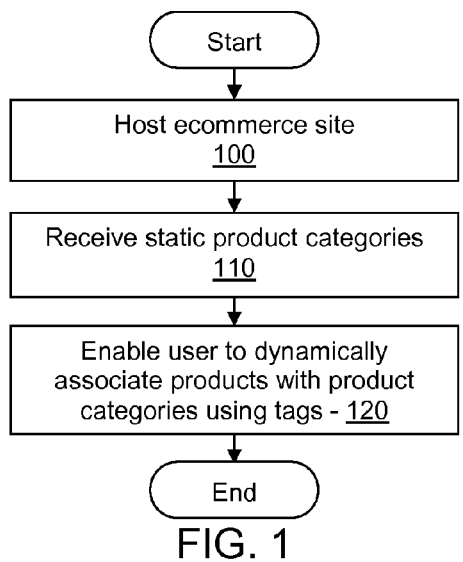
FIG. 1 is a flow diagram illustrating a possible embodiment of a method for dynamically associating a product with a category in a static category environment using metadata tags.

The present inventions will now be discussed in detail with regard to the attached drawing figures which were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A Static Category to Product Association Method Using Metadata Tags

Several different methods may be used to provide and manage the disclosed invention. In an example embodiment illustrated in FIG. 1, an ecommerce site may be hosted on a hosting computer communicatively coupled to a network (Step 100). A static product category may be received by a user for a product on the ecommerce site (Step 110) and the user may be enabled to dynamically associate the product with the static product category using a metadata tag (Step 120).

The user, may be an individual or an entity including a person, a business, a governmental institution, an educational institution, a non-profit organization, or a social organization or any other individual or organization that may access and use an ecommerce site.

Figure 2:
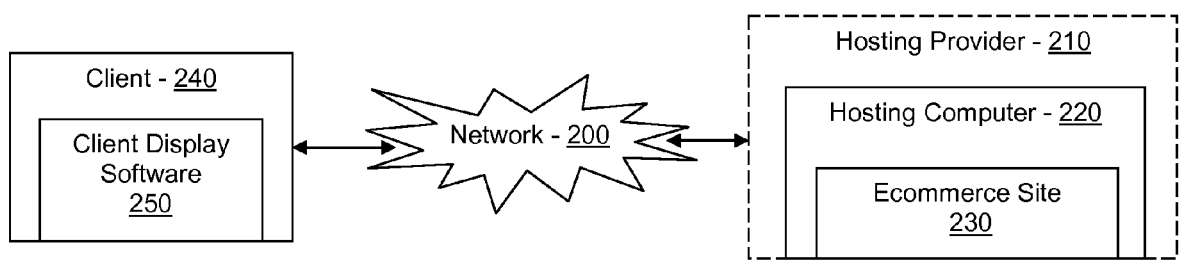
FIG. 2 illustrates a possible environment wherein a product may be dynamically associated to a category in a static category environment using metadata tags.

Several different environments may be used to complete the steps required for the disclosed invention. FIG. 2 demonstrates such an example environment. An Ecommerce Site 230 may be hosted on a Hosting Computer 220 provided by a Hosting Provider 210. A Client 240 may use Client Display Software 250 to access the Ecommerce Site 230 through a Network 200. This environment and its components, as described in detail below, may provide the structure for various means for executing the steps involved in accomplishing the invention as disclosed.

The Ecommerce Site 230 may be any web page or collection of web pages hosted on a Hosting Computer 220 that consists of the buying and selling of products or services over electronic systems such as the Internet and other computer Networks 200. For example, a user may go online to purchase such items as clothes, books, grocery items, real estate, financial exchanges such as stock sales, online banking services such as online bill payments, transferring funds from one account to another and/or initiating wire payment to another country. These examples should not limit the scope of the disclosed invention.

The example embodiments shown and described should likewise not limit possible network configuration or connectivity. The Network 200 may comprise any combination of the Internet, an intranet, an extranet, a local area network, a wide area network, a wired network, a wireless network, a telephone network, or any other known or later developed network.

The Hosting Computer 220 used to host the Ecommerce Site 230 may be any combination of computers or programs that provide services to other computers, programs, or users. This may be accomplished within the same computer or over a computer Network 200. For example, the Hosting Computer 220 and/or the Client 240 may be any combination of operating systems, full file systems, other necessary utilities, software and/or applications stored and executed on a computer-readable medium and its related hardware. Such a Hosting Computer 220 or Client 240 may access an application, communication, mail, database, proxy, fax, file, media, web, peer-to-peer, software, standalone computers and/or servers.

The Hosting Computer 220 and/or Client 240 may further include server capabilities. Such server capabilities may utilize any combination of known or later developed server technologies or formats. Such technologies or formats may include, but are not limited to shared hosting, virtual dedicated hosting, dedicated hosting, or any combination thereof.

The Hosting Provider 210 may provide hosting services including, but not limited to hosting the Hosting Computer 220 in a data center as well as providing the general infrastructure necessary to offer hosting services to Internet users including hardware, software, Internet web sites, hosting servers, and electronic communication means necessary to connect the Hosting Computer 220 to the Internet or any other Network 200.

A Client 240 may be any application or system including, but not limited to a computer, laptop, telephone, handheld device, etc. that accesses a possibly remote service on a server or other computer system using a Network 200, and may run its own stand-alone programs. In other words, the Client 240 may be a thick (also known as fat or rich) client, a thin client or a hybrid thick/thin client, which processes locally, but relies on a server for storage data.

Non-limiting example programming environments for Client 240 may include JavaScript/AJAX (client side automation), ASP, JSP, Ruby on Rails, Python's Django, PHP, HTML pages or rich media like Flash, Flex or Silverlight.

Client Display Software 250 may be used for authenticated remote access to the Hosting Computer 220. Such authenticated remote access may be accomplished, but is not limited to using a remote desktop program and/or a web browser, as are known in the art.

The Hosting Computer 220, the Client 240, and the software utilized by either may be communicatively coupled to the Network 200 using any combination of known or later developed network connection methods including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (Ti, Frame Relay) or Point-to-Point Protocol over Ethernet (PPPoE).

The metadata tag may be a non-hierarchical keyword or term assigned to a piece of information such as a product on an ecommerce site. This kind of metadata may describe an item and may allow it to be found again by browsing or searching. Metadata tags may be chosen by, for example, the ecommerce merchant, an ecommerce supplier or an ecommerce customer, depending on the system.

Figures 3, 4:
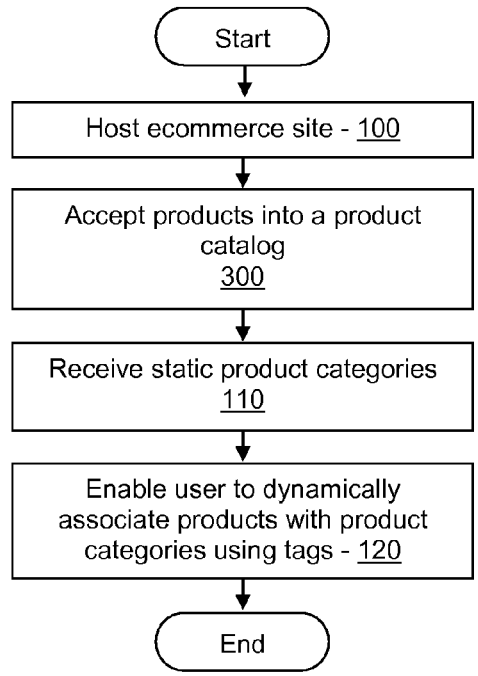
FIG. 3 is a flow diagram illustrating a possible embodiment including accepting products into a product catalog.
FIG. 4 illustrates a possible embodiment of an interface for accepting products into a product catalog.

FIG. 1 and a more detailed embodiment shown in FIG. 3 show that the step of accepting a product into a product catalog (Step 300) may be included. The information included in accepting such a product may include a product name and a product description. The product name and product description may include any combination of a single word, a text string and a verbose text string.

For example, a user such as an ecommerce merchant may use a Client Display Software 250 on a Client 240 to access and log into their Ecommerce Site 230. The Hosting Computer 220 that the Ecommerce Site 230 resides on may be accessed through a Network 200 and a user interface as seen in FIG. 4 may be displayed on the Client Display Software 250. This structure and like interfaces may be equally applied to all examples and example interfaces throughout this disclosure.

The interface used is not limited to that seen in FIG. 4 or the example interfaces that follow. The user interface may be any graphical, textual and/or auditory information a computer program presents to the user, and the control sequences such as keystrokes, movements of the computer mouse, selections with a touch screen etc. used to control the program. Examples of such interfaces include any known or later developed combination of Graphical User Interfaces (GUI) or Web-based user interfaces as seen in FIG. 4, Touch interfaces, Conversational Interface Agents, Live User Interfaces (LUI), Command line interfaces, Non-command user interfaces, Object-oriented User Interfaces (OOUI) or Voice user interfaces.

FIG. 4 shows an example user interface using the structure previously disclosed which may be used to accept products into a product catalog (Step 300). If the user is an ecommerce merchant that specializes in clothing such as hats, shirts and pants, and receives a new product known as a "Flamingo Ten Gallon Hat," the user may enter the information for this product into the interface. Separate fields may be provided for the user to enter the name of the product and a description for such a product as are shown in FIG. 4.

This and similar examples throughout this disclosure are not intended to and should not limit the scope of the disclosed invention. As a case in point, FIG. 4 shows the product name and description being entered within a text box and text field respectively, but this or any other information could be accepted using any field, widget and/or control used in such interfaces, including but not limited to a text-box, text field, button, hyper-link, list, drop-down list, check-box, radio button, data grid, icon, graphical image, embedded link, etc.

Figures 5, 6:
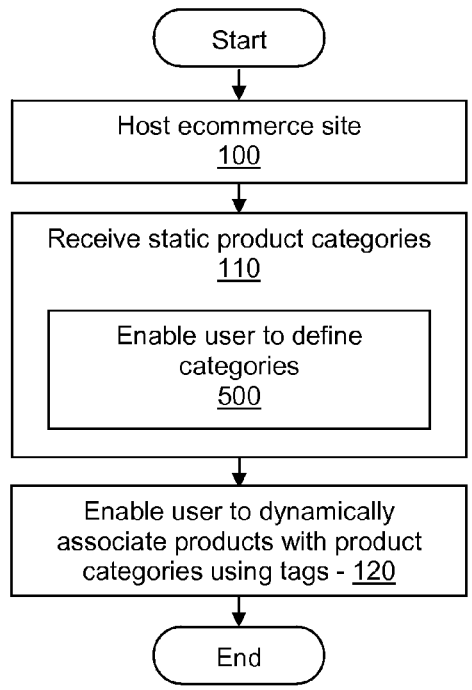
FIG. 5 is a flow diagram illustrating a possible embodiment including enabling a user to define static product categories.
FIG. 6 illustrates a possible embodiment of an interface for enabling a user to define static product categories.

An embodiment shown in FIG. 5 shows that the step of enabling a user to define the static product category and one or more additional static product categories (Step 500) may be included.

FIG. 6 shows an example user interface using the structure previously disclosed which may be used to enable a user to define the static product category and one or more additional static product categories (Step 500). For example, an online clothing merchant may define such categories as "Hats," "Shirts" and "Pants" by entering these categories into a series of provided text boxes. The user may then update the categories within the catalog, possibly by clicking a button on the interface.

Figures 7, 8:
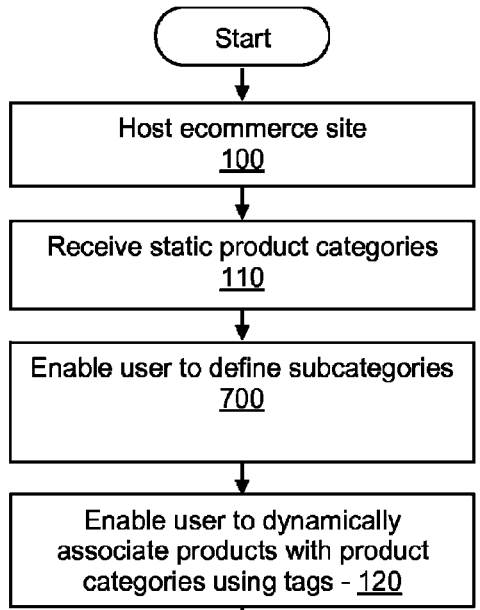
FIG. 7 is a flow diagram illustrating a possible embodiment including enabling a user to define product subcategories.
FIG. 8 illustrates a possible embodiment of an interface for enabling a user to define product subcategories.

An embodiment shown in FIG. 7 shows that the step of enabling a user to define a product subcategory associated with the static product category (Step 700) may be included.

FIG. 8 shows an example user interface using the structure previously disclosed which may be used to enable a user to define a static product subcategory associated with the static product category (Step 700). For example, an online clothing merchant, after defining the static categories of Hats, Shirts and Pants may wish to create and associate the subcategories "Cowboy Hats," "Baseball Hats" and "Bowler Hats" with the static category of Hats.

This may be accomplished in this example by selecting the previously created static category of Hats from a drop-down list. After selecting the category, fields may be provided for the user to enter subcategories associated with the selected category. The user may then update the categories and associations, possibly by clicking a button on the interface.

Figures 9, 10:
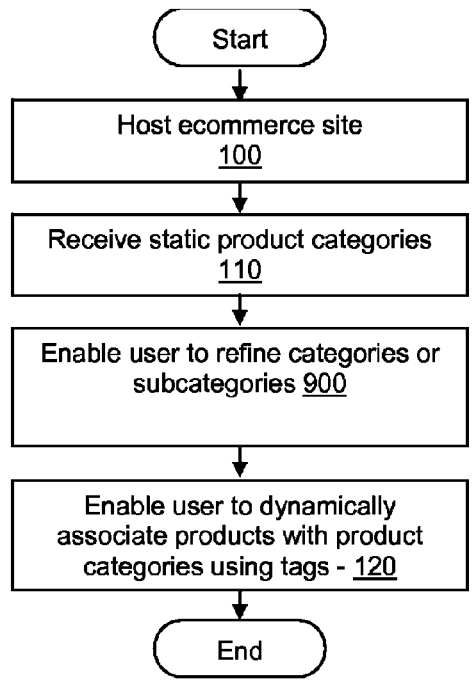
FIG. 9 is a flow diagram illustrating a possible embodiment including enabling a user to refine product categories and/or subcategories.
FIG. 10 illustrates a possible embodiment of an interface for enabling a user to refine product categories and subcategories.

An embodiment shown in FIG. 9 shows that the step of enabling a user to refine a static product category or any associated product subcategory (Step 900) by defining additional product features may be included.

FIG. 10 shows an example user interface using the structure previously disclosed which may be used to refine a static product category or any associated product subcategory (Step 900) by defining additional features of the product. For example, an online clothing merchant, after defining the subcategories of "Cowboy Hats," "Baseball Hats" and "Bowler Hats" may wish to refine the subcategory Cowboy Hats by including the color of the cowboy hats within that static category and subcategory. The user may include the colors pink and brown as features of cowboy hats.

This may be accomplished by selecting the previously created subcategory of Cowboy Hats from a drop-down list. After selecting the subcategory, fields may be provided for the user to enter a feature for the category or subcategory such as "Color". Additional fields may be provided to allow entry of the specific features. In this example, "Pink" and "Brown" may be entered as Color features of the subcategory Cowboy Hats. The user may than update and associate the features with the selected category or subcategory, possibly by clicking a button on the interface.

Figures 11, 12:
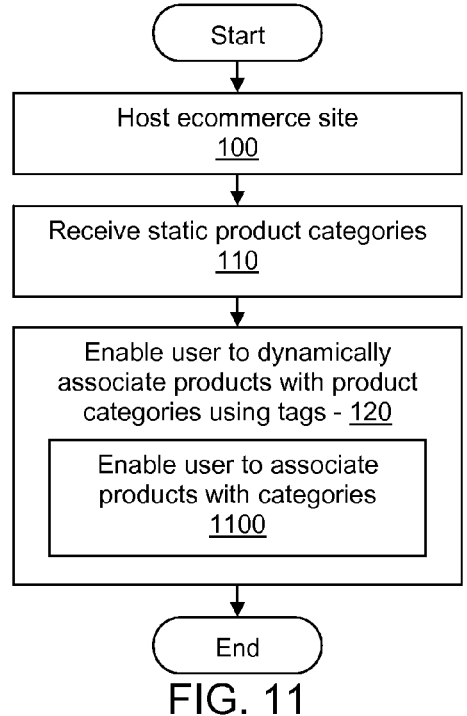
FIG. 11 is a flow diagram illustrating a possible embodiment including enabling a user to associate products with categories.
FIG. 12 illustrates a possible embodiment of an interface for enabling a user to associate products with categories.

An embodiment shown in FIG. 11 shows that the step of enabling the user to dynamically associate the product with the static product category using a metadata tag (Step 120) may include a step of enabling the user to associate the product with the static product category (Step 1100). As seen in FIG. 12, enabling the user to associate the product with the static product category may further include the steps of selecting the product and selecting the metadata tag which associates the product with the static product category.

FIG. 12 shows an example user interface using the structure previously disclosed which may be used to enable the user to associate the product with the static product category (Step 1100). For example, an online clothing merchant may wish to associate a product, such as the Flamingo Ten Gallon Hat with a product category, such as Hats.

This may be accomplished in this example by the user selecting the Flamingo Ten Gallon Hat from a product drop-down list, and either selecting the tag associated with the product from a tag drop down list, or entering the tag as text from multiple provided options into a provided text field. The user may then update the tag association, possibly by clicking a button on the interface.

Figures 13, 14:
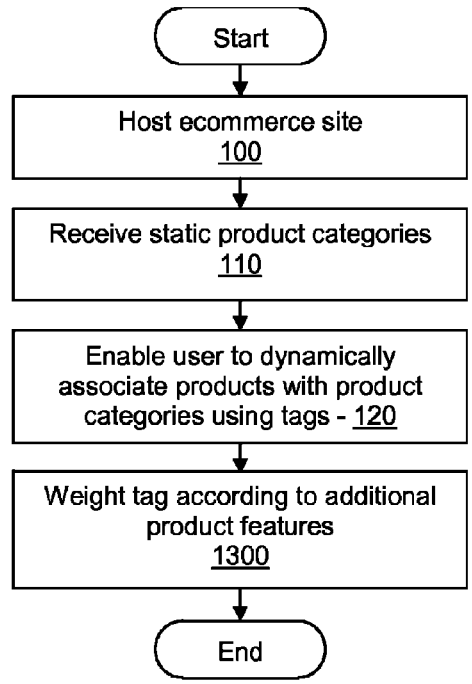
FIG. 13 is a flow diagram illustrating a possible embodiment including assigning a tag weight according to additional product features.
FIG. 14 illustrates a possible embodiment of an interface for assigning a tag weight according to additional product features.

An embodiment shown in FIG. 13 shows that the step of giving the metadata tag additional weight according to the additional product features (Step 1300) may be included. The additional weight given to the metadata tag may determine the importance of the product in the product catalog, and may be determined based on the number of words in the tag FIG. 14 shows an example user interface using the structure previously disclosed which may be used to give the metadata tag additional weight according to the additional product features (Step 1300). For example, an online clothing merchant may be informed that the product has been associated with a category and that the product may be weighted and given more importance in the catalog according to further product details. The user may then a select additional feature to give the product's associated tag greater weight within the catalog.

This may be accomplished in this example by informing the user that the product Flamingo Ten Gallon Hat has been associated with the category Hats. Options to further weight the tag may be provided, for example, by allowing the user to select the subcategory of Cowboy Hat from a drop-down list, and additional features, such as Color, may also be selected from a drop-down list to further weight the tag. The weighted tag including any subcategories and additional features may be displayed to the user, possibly by parsing out and combining keywords of the subcategory and additional features. The user may then update the tag weight, possibly by clicking a button on the interface.

A Dynamic Category to Product Association Method Using Metadata Tags

Several different methods may be used to provide and manage the disclosed invention. In an example embodiment illustrated in FIG. 15, an ecommerce site may be hosted on a hosting computer communicatively coupled to a network (Step 100). A user may be enabled to create metadata tags associated with a product on the ecommerce site (Step 1500) and the metadata tag may be used to dynamically create a product category associated with the product (Step 1510).

FIG. 15 shows that the step of accepting a product into a product catalog (Step 300) may be included. FIG. 16 shows an example user interface for accepting a product into a product catalog. These steps may be accomplished using the structure, methods and interfaces previously disclosed within this specification.

Figure 17:
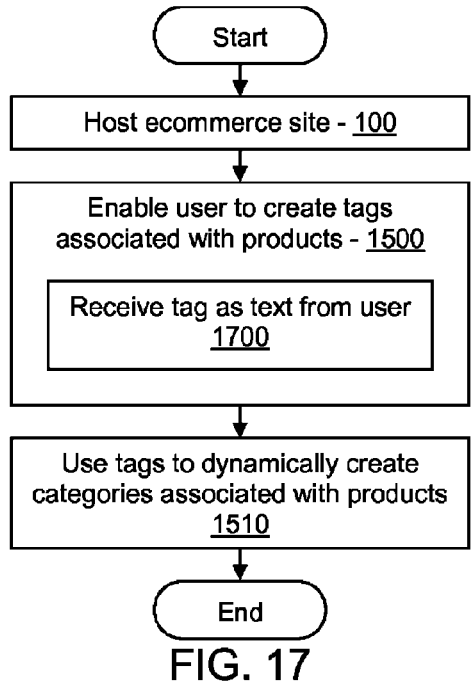
FIG. 17 is a flow diagram illustrating a possible embodiment including receiving a tag as text from a user.

An embodiment shown in FIG. 17 shows that the step of enabling a user to create a metadata tag associated with a product on the ecommerce site (Step 1500) may include a step of receiving the metadata tag as text from the user (Step 1700).

Figure 18:
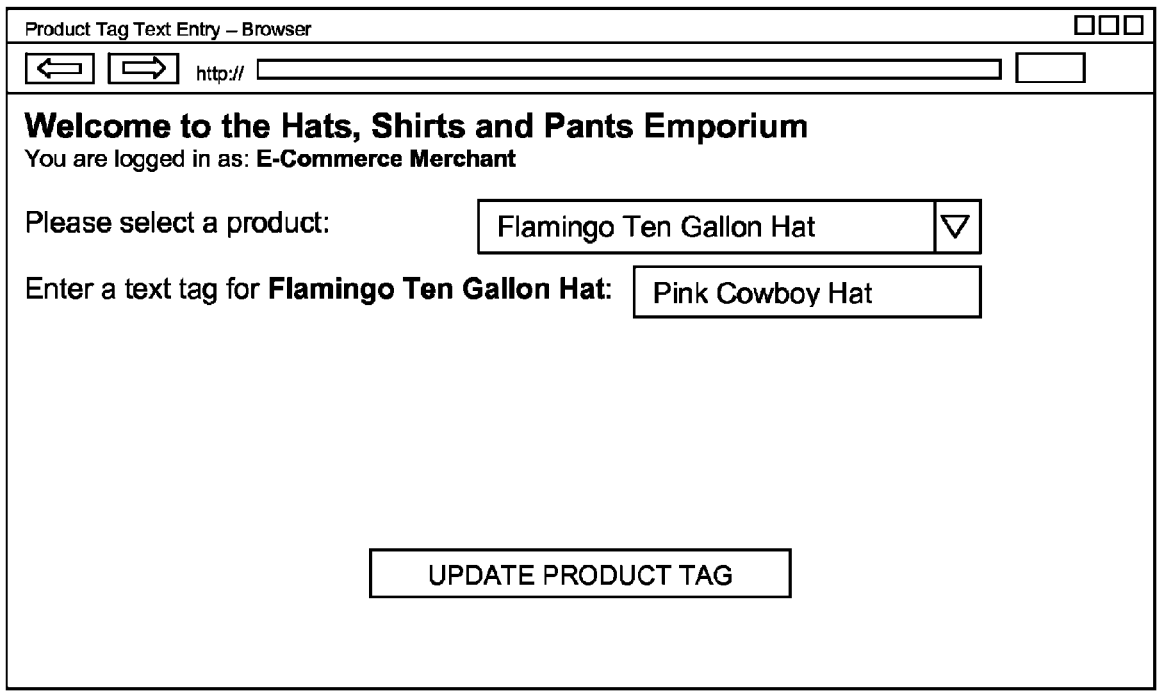
FIG. 18 illustrates a possible embodiment of an interface for receiving a tag as text from a user.

FIG. 18 shows an example user interface using the structure previously disclosed which may be used to receive the metadata tag as text from the user (Step 1700). For example, an online clothing merchant may select a previously received catalog product and enter the metadata tag as text within the provided interface.

This may be accomplished in this example by selecting the product Flamingo Ten Gallon Hat from a drop-down list within the interface. A text box or text field may be provided for the user to enter a text tag for the Flamingo Ten Gallon Hat, in this case "Pink Cowboy Hat". The user may then update the product tag, possibly by clicking a button on the interface.

Figure 19:
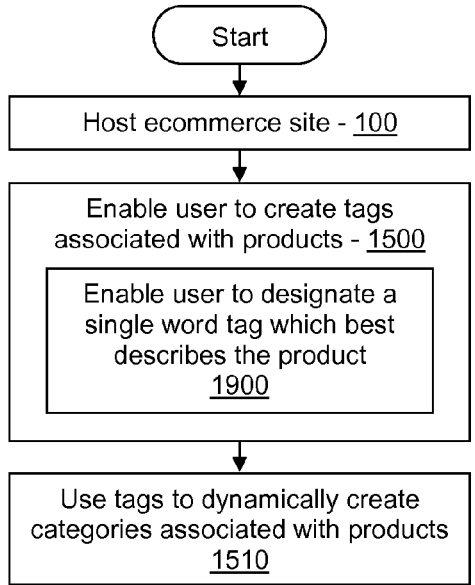
FIG. 19 is a flow diagram illustrating a possible embodiment including enabling a user to designate a single word tag which best describes the product.

An embodiment shown in FIG. 19 shows that the step of enabling a user to create a metadata tag associated with a product on the ecommerce site (Step 1500) may include a step of enabling the user to designate a single word tag from the text of the metadata tag which best describes the product (Step 1900).

Figure 20:
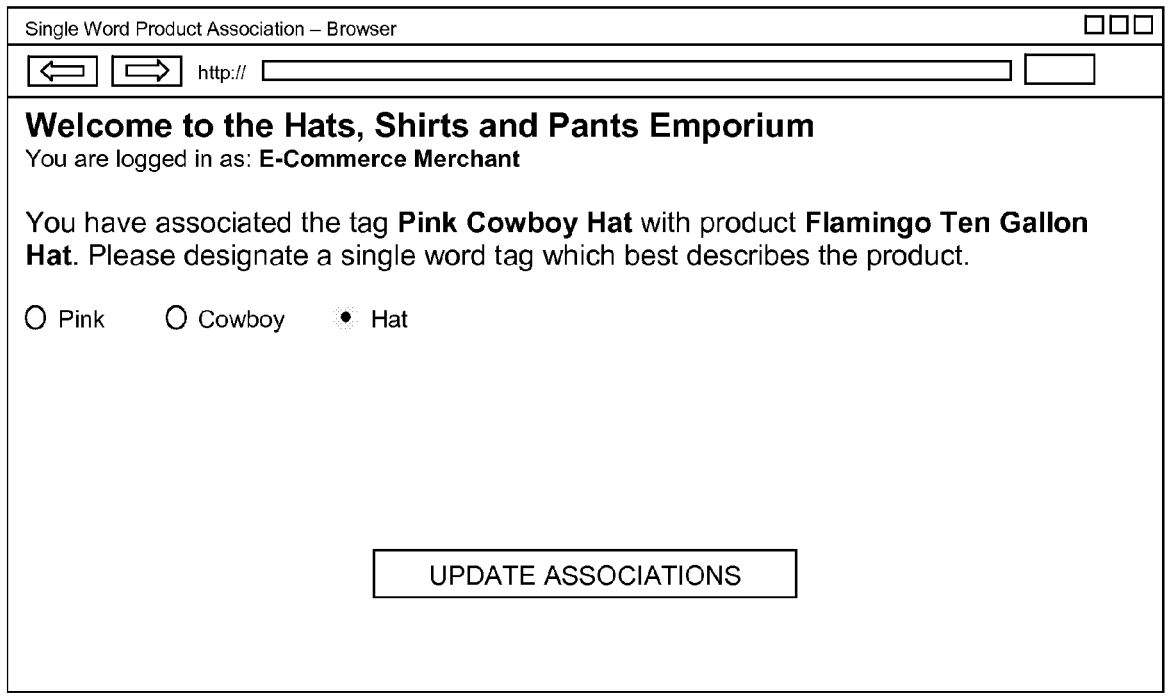
FIG. 20 illustrates a possible embodiment of an interface for enabling a user to designate a single word tag which best describes the product.

FIG. 20 shows an example user interface using the structure previously disclosed which may be used to designate a single word tag from the text of the metadata tag which best describes the product (Step 1900). This may be accomplished in this example by showing the user that the tag Pink Cowboy Hat has been associated with the product Flamingo Ten Gallon Hat. A method of selection, possibly a radio button as in this example, may be provided to allow the user to select a single word tag such as "Hat" which best describes the product. The user may then update the product tag associations, possibly by clicking a button on the interface.

Figures 21, 22:
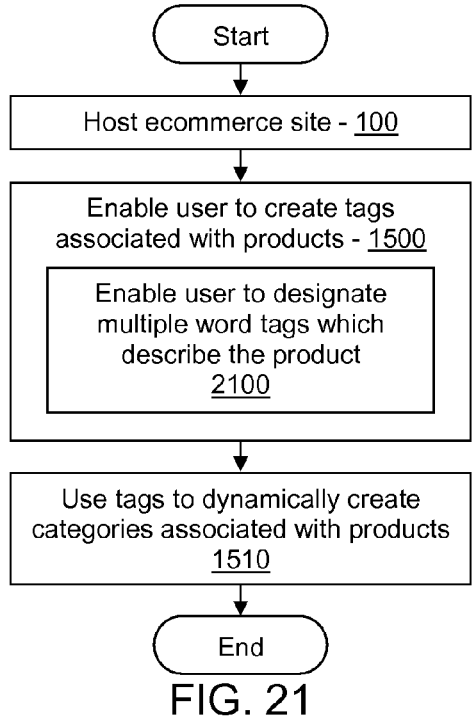
FIG. 21 is a flow diagram illustrating a possible embodiment including enabling a user to designate multiple word tags which describe the product.
FIG. 22 illustrates a possible embodiment of an interface for enabling a user to designate multiple word tags which describe the product.

An embodiment shown in FIG. 21 shows that the step of enabling a user to create a metadata tag associated with a product on the ecommerce site (Step 1500) may include a step of enabling the user to designate a multiple word tag from the text of the metadata tag which describes the product (Step 2100).

FIG. 22 shows an example user interface using the structure previously disclosed which may be used to enable the user to designate a multiple word tag from the text of the metadata tag which describes the product (Step 2100). This may be accomplished in this example by showing the user that the tag Pink Cowboy Hat has been associated with the product Flamingo Ten Gallon Hat. A method of selection, possibly a combination of checkboxes next to word tokens selected from the metadata tag text as in this example, may be provided to allow the user to select multiple word tags which best describe the product such as Pink combined with Hat to form "Pink Hat" and Cowboy combined with Hat to form "Cowboy Hat". The user may then update the product tag associations, possibly by clicking a button on the interface.

The presentation of the multiple word choices may be accomplished by parsing the metadata tag text provided into several word tokens taken from the string of the provided metadata tag text. Parsing, also known as syntactic analysis may be any process of analyzing a sequence of tokens to determine their grammatical structure. Tokens may be any sequence of characters which may be converted into recognized words or blocks of text.

In this example, the tag Pink Cowboy Hat may be parsed into the tokens Pink, Cowboy and Hat. A computer may not recognize as a human would that there are three separate words or tokens. However, a computer may use delimiters such as the space between the three word tokens to parse the entered metadata tag text into three separate tokens. This example is for demonstration purposes only and should not limit the scope of the invention. Any combination of known or later developed parsing techniques could be used to determine the tokens available for multiple word tags available to the user.

Figures 23, 24:
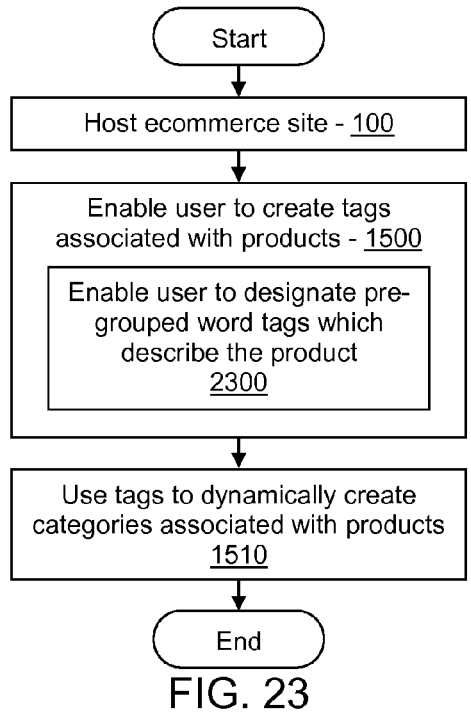
FIG. 23 is a flow diagram illustrating a possible embodiment including enabling a user to designate pre-grouped word tags which describe the product.
FIG. 24 illustrates a possible embodiment of an interface for enabling a user to designate pre-grouped word tags which describe the product.

An embodiment shown in FIG. 23 shows that the step of enabling a user to create a metadata tag associated with a product on the ecommerce site (Step 1500) may include a step of enabling the user to designate pre-grouped word tags from the text of the metadata tag which describes the product (Step 2300).

FIG. 24 shows an example user interface using the structure previously disclosed which may be used to enabling the user to designate a pre-grouped word tag from the text of the metadata tag which describes the product (Step 2300). This may be accomplished in this example by showing the user that the tag Pink Cowboy Hat has been associated with the product Flamingo Ten Gallon Hat. A method of selection, possibly checkboxes next to pre-grouped word tags selected from the metadata tag text as in this example, may be provided to allow the user to select pre-grouped word tags which best describes the product such as Pink, Cowboy, Hat, Pink Hat, Cowboy Hat, etc. The parsing of the metadata tag text into tokens to form the pre-grouped word tags may be accomplished as previously disclosed. The user may then update the product tag associations, possibly by clicking a button on the interface.

Figure 25:
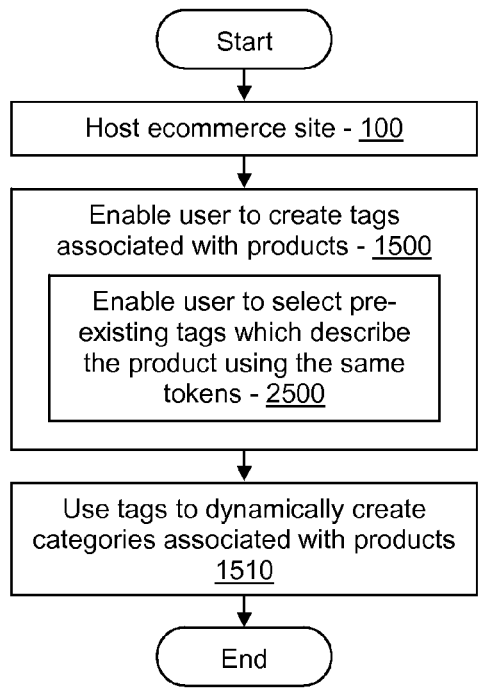
FIG. 25 is a flow diagram illustrating a possible embodiment including enabling a user to select pre-existing tags which describe the product using the same tokens.

An embodiment shown in FIG. 25 shows that the step of using the metadata tag to dynamically create a product category associated with the product (Step 1510) may include a step of accepting from the user a selection of one or more existing product categories related to the text of the metadata tag with which to associate the product (Step 2500).

Figure 26:
FIG. 26 illustrates a possible embodiment of an interface for enabling a user to select pre-existing tags which describe the product using the same tokens.

FIG. 26 shows an example user interface using the structure previously disclosed which may be used to accept from the user a selection of one or more existing product categories related to the text of the metadata tag with which to associate the product (Step 2500). This may be accomplished in this example by showing the user that the tag Pink Cowboy Hat has been associated with the product Flamingo Ten Gallon Hat.

Based on the tokens parsed from the text of the input metadata tag as previously disclosed, a method of selection, possibly checkboxes next to existing product category tags using combinations of the same tokens, may be provided to allow the user to select pre-existing product category tags which best describe the product. Examples may include Pink Cowboy Hat, Pink Hat, Cowboy Hat, etc. The user may then update the product tag associations, possibly by clicking a button on the interface.

Figure 27:
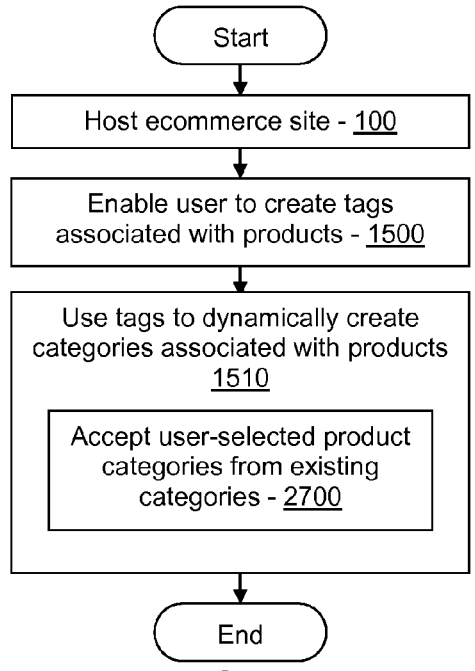
FIG. 27 is a flow diagram illustrating a possible embodiment including accepting user-selected product categories from existing categories.

An embodiment shown in FIG. 27 shows that the step of using the metadata tag to dynamically create a product category associated with the product (Step 1510) may include a step of accepting from the user a selection of one or more existing product categories related to the text of the metadata tag with which to associate the product (Step 2700).

Figure 28:
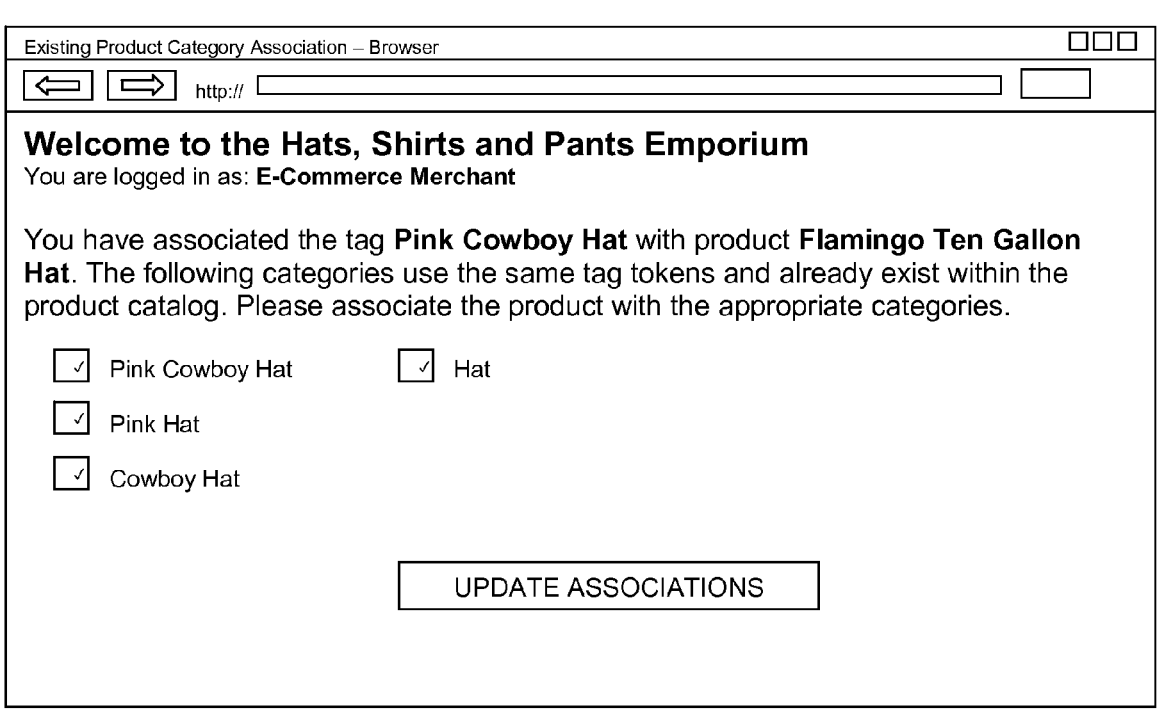
FIG. 28 illustrates a possible embodiment of an interface for accepting user-selected product categories from existing categories.

FIG. 28 shows an example user interface using the structure previously disclosed which may be used to accept from the user a selection of one or more existing product categories related to the text of the metadata tag with which to associate the product (Step 2700). This may be accomplished in this example by showing the user that the tag Pink Cowboy Hat has been associated with the product Flamingo Ten Gallon Hat.

Tokens may be parsed, as previously disclosed, from the text of the input metadata tag. Based on the parsed tokens, a method of selection such as checkboxes next to existing product category tags which use combinations of the same tokens may be provided to allow the user to select pre-existing product category tags which best describe the product. Examples of such pre-existing category tags in this example may include Pink Cowboy Hat, Pink Hat, Cowboy Hat, etc. The user may then update the tag associations for the product, categories and catalog, possibly by clicking a button on the interface.

Figure 29:
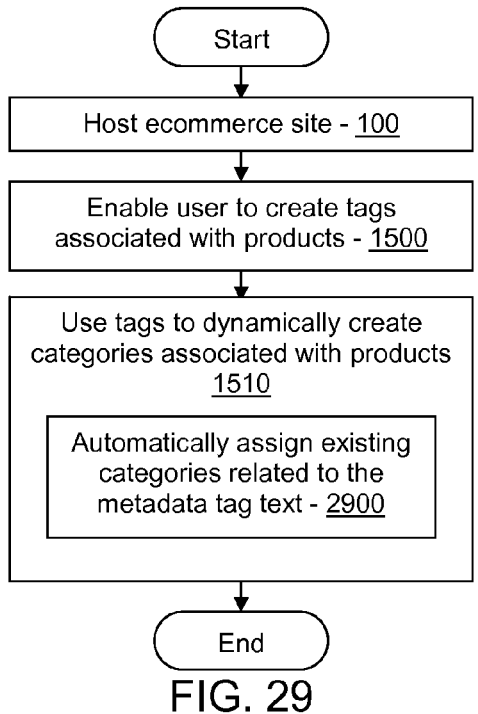
FIG. 29 is a flow diagram illustrating a possible embodiment including automatically assigning existing categories related to the metadata tag text.

An embodiment shown in FIG. 29 shows that the step of using the metadata tag to dynamically create a product category associated with the product (Step 1510) may include a step of automatically assigning to the product one or more existing product categories related to the text of the metadata tag (Step 2900).

Figure 30:
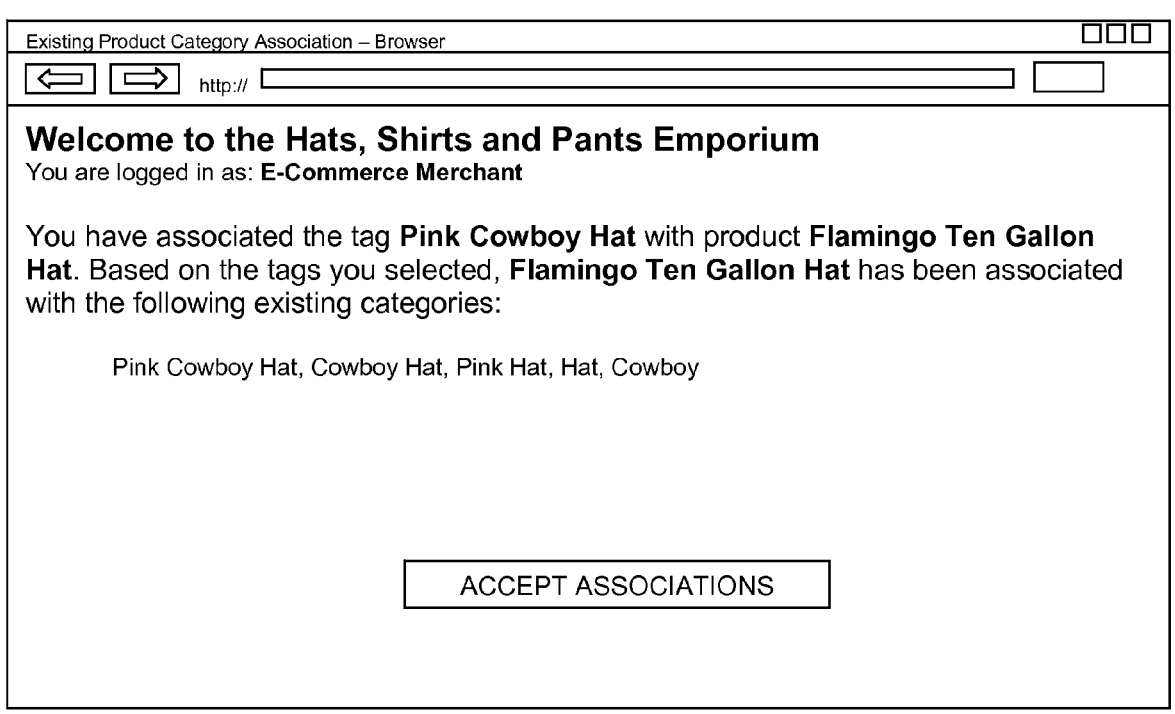
FIG. 30 illustrates a possible embodiment of an interface for automatically assigning existing categories related to the metadata tag text.

FIG. 30 shows an example user interface using the structure previously disclosed which may be used to automatically assign to the product one or more existing product categories related to the text of the metadata tag (Step 2900). This may be accomplished in this example by showing the user that the tag Pink Cowboy Hat has been associated with the Flamingo Ten Gallon Hat.

Based on a plurality of tags selected from the input tag Pink Cowboy Hat or based on the input tag itself, one or more existing product categories, such as Pink Cowboy Hat, Cowboy Hat, Pink Hat, Hat and Cowboy in this example may be automatically displayed and associated with the product Flamingo Ten Gallon Hat. The user may then accept and update the tag associations for the product, categories and/or catalog, possibly by clicking a button on the interface.

Figure 31:
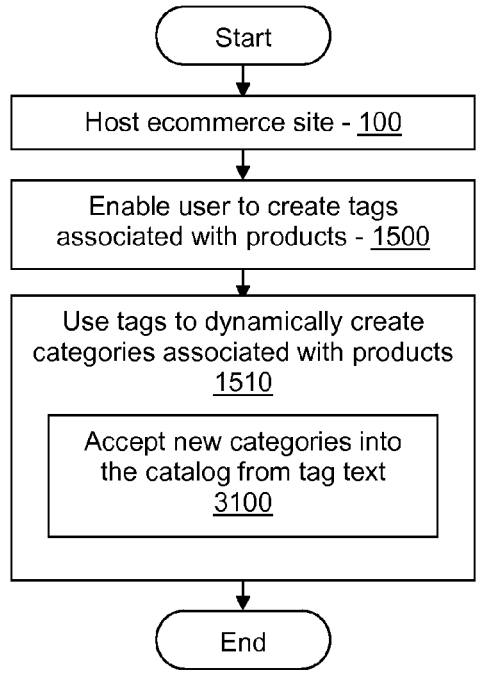
FIG. 31 is a flow diagram illustrating a possible embodiment including accepting new categories into the catalog related to the metadata tag text.

An embodiment shown in FIG. 31 shows that the step of using the metadata tag to dynamically create a product category associated with the product (Step 1510) may include a step of accepting from the user a new category in the catalog related to the text of the metadata tag (Step 3100).

Figure 32:
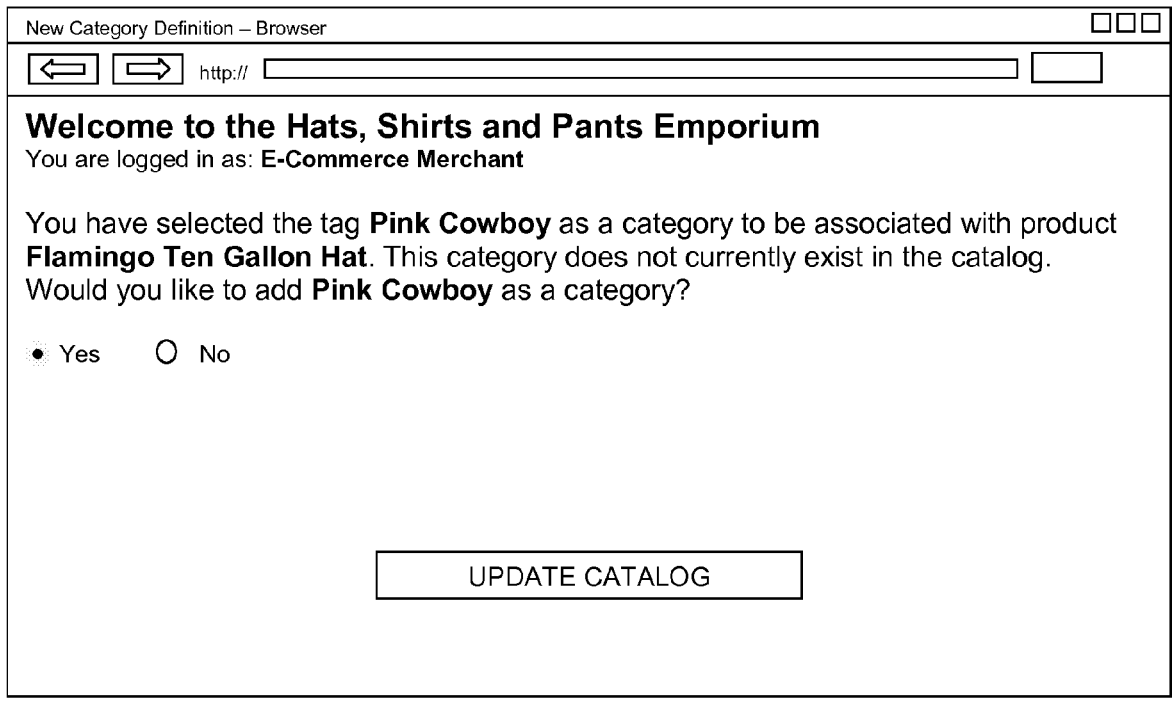
FIG. 32 illustrates a possible embodiment of an interface for accepting new categories into the catalog related to the metadata tag text.

FIG. 32 shows an example user interface using the structure previously disclosed which may be used to accept from the user a new category in the catalog related to the text of the metadata tag (Step 3100). This may be accomplished in this example by showing the user that the tag Pink Cowboy Hat has been associated with the Flamingo Ten Gallon Hat. Based on a plurality of tags selected from the input tag Pink Cowboy Hat or based on the input tag itself, one or more category tags that do not exist in the catalog may be suggested to the user, such as Pink Cowboy in this example. The new category Pink Cowboy may be displayed and associated with the product Flamingo Ten Gallon Hat. The user may then update the tag associations for the product, categories and/or catalog, possibly by clicking a button on the interface.

Figure 33:
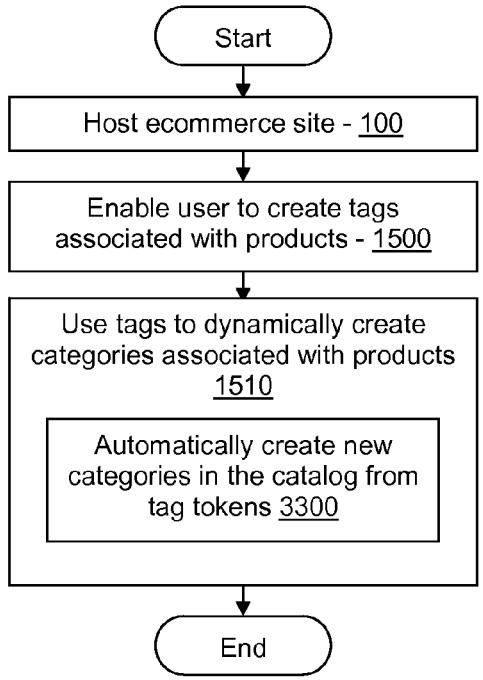
FIG. 33 is a flow diagram illustrating a possible embodiment including automatically creating new categories in the catalog from tag tokens.

An embodiment shown in FIG. 33 shows that the step of using the metadata tag to dynamically create a product category associated with the product (Step 1510) may include a step of automatically creating a new category in the catalog related to the text and tokens of the metadata tag (Step 3300).

Figure 34:
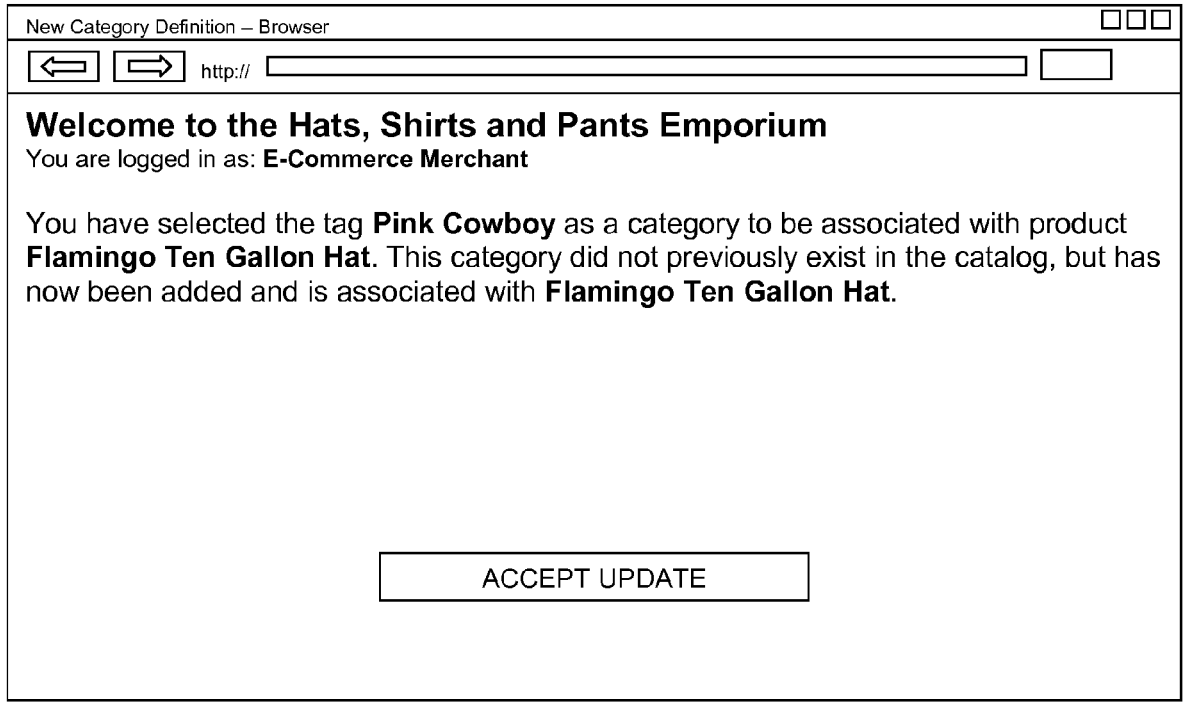
FIG. 34 illustrates a possible embodiment of an interface for automatically creating new categories in the catalog from tag tokens.

FIG. 34 shows an example user interface using the structure previously disclosed which may be used to automatically create a new category in the catalog related to the text of the metadata tag (Step 3300). This may be accomplished in this example by showing the user that the tag Pink Cowboy Hat has been associated with the product Flamingo Ten Gallon Hat.

Based on a plurality of tags selected from the input tag Pink Cowboy Hat or based on the input tag itself, one or more category tags that do not exist in the catalog may be automatically suggested to the user, such as Pink Cowboy in this example. The new category Pink Cowboy may be automatically displayed and associated with the product Flamingo Ten Gallon Hat. The user may then accept and update the tag associations for the product, categories and catalog, possibly by clicking a button on the interface.

An embodiment shown in FIG. 35 shows that the step of using the metadata tag to dynamically create a product category associated with the product (Step 1510) may include a step of accepting from the user a ranking of a plurality of tags selected from the created tag to assign each of the selected tags a weight of importance within the product catalog (Step 3500).

FIG. 36 shows an example user interface using the structure previously disclosed which may be used to accept from the user a ranking of a plurality of tags selected from the created tag to assign each of the selected tags a weight of importance within the product catalog (Step 3500). This may be accomplished in this example by showing the user combinations of word tokens such as Pink, Cowboy Hat, etc. that have been associated with the product Flamingo Ten Gallon Hat.

The user may assign a rank order to the tags by placing a number in a text box next to the combinations of word tokens beginning with 1 as the highest rank. Each combination of tokens may then be assigned a subsequent rank, with each rank number representing a lower weight of importance in the product catalog than the one before. The user may then submit and update the ranking for the product, categories and catalog, possibly by clicking a button on the interface.

Any criteria and methods known in the art may be used in this and the following embodiments and examples as a basis for ranking and/or weighting the tags. Non-limiting examples may include ranking and/or weighting the tags by length, number of words and/or comparison with existing product/catalog tags.

Figures 37, 38:
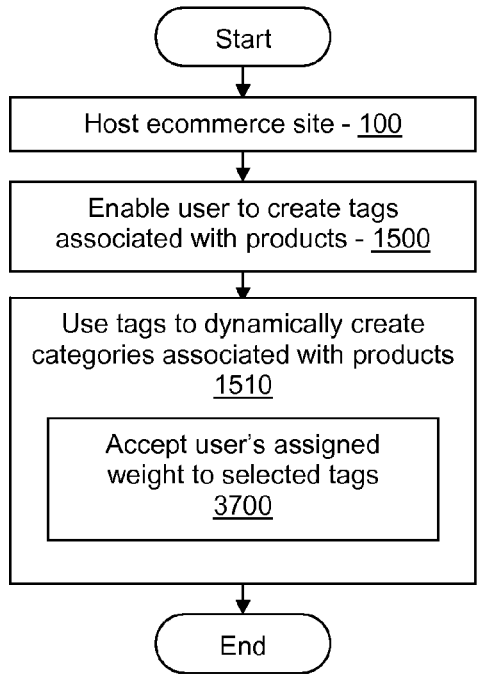
FIG. 37 is a flow diagram illustrating a possible embodiment including accepting a user's assigned weight to selected tags.
FIG. 38 illustrates a possible embodiment of an interface for accepting a user's assigned weight to selected tags.

An embodiment shown in FIG. 37 shows that the step of using the metadata tag to dynamically create a product category associated with the product (Step 1510) may include a step of accepting from the user an assignment of weight of importance within the product catalog for a plurality of tags selected from the created tag (Step 3700).

FIG. 38 shows an example user interface using the structure previously disclosed which may be used to accept from the user an assignment of weight of importance within the product catalog for a plurality of tags selected from the created tag (Step 3700). This may be accomplished in this example by showing the user combinations of word tokens such as Pink, Cowboy Hat, etc. that have been associated with the product Flamingo Ten Gallon Hat.

The user may assign a weight to each of the tags by placing a number in a text box next to the combinations of word tokens, with 3 possibly being assigned the highest weight and 0 being no weight. Each combination of tokens may then be assigned weight and the user may then submit and update the weight for the tags and associated product, categories and catalog, possibly by clicking a button on the interface.

Figure 39:
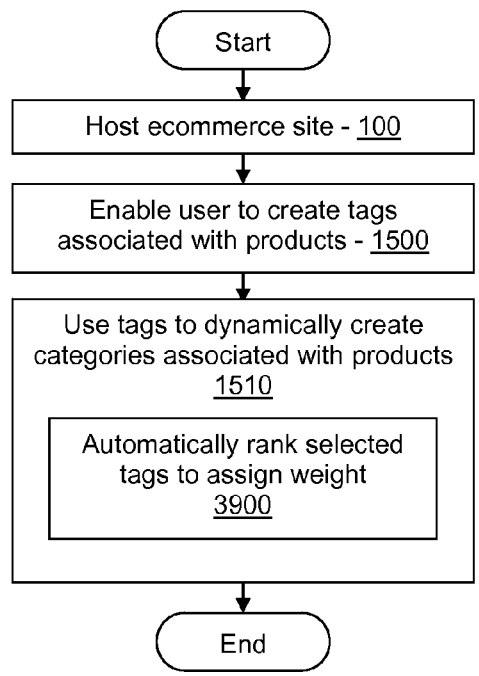
FIG. 39 is a flow diagram illustrating a possible embodiment including automatically ranking selected tags to assign weight.

An embodiment shown in FIG. 39 shows that the step of using the metadata tag to dynamically create a product category associated with the product (Step 1510) may include a step of automatically ranking a plurality of tags selected from the created tag to assign each of the selected tags a weight of importance within the product catalog (Step 3900).

Figure 40:
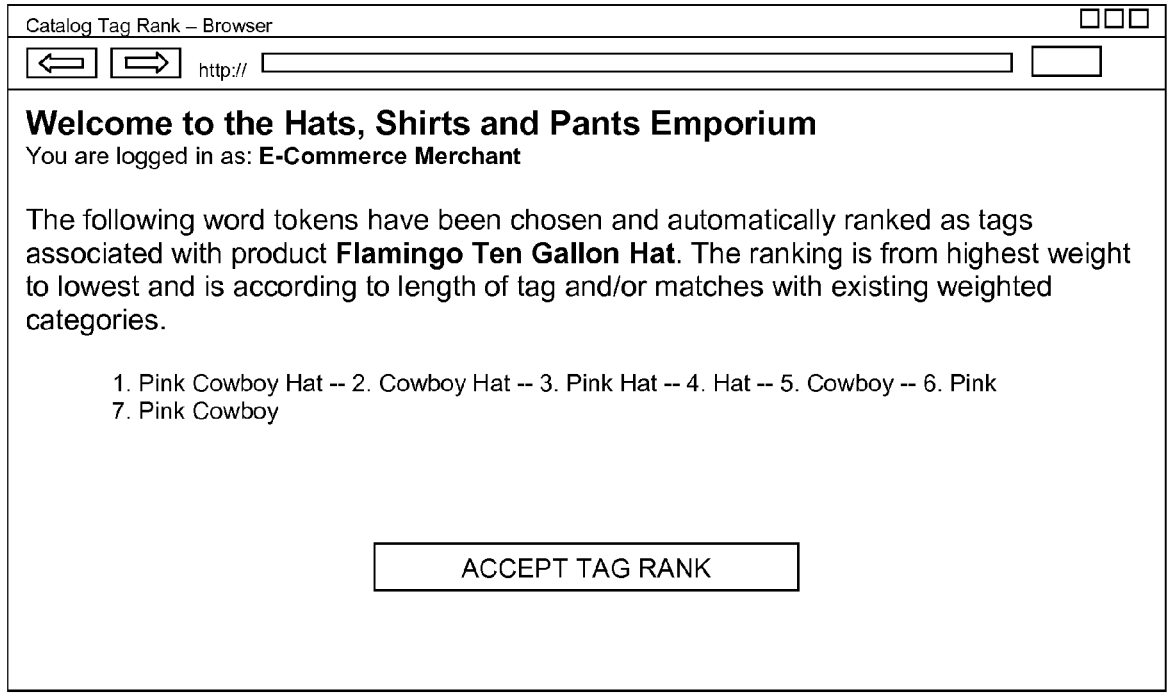
FIG. 40 illustrates a possible embodiment of an interface for automatically ranking selected tags to assign weight.

FIG. 40 shows an example user interface using the structure previously disclosed which may be used to automatically rank a plurality of tags selected from the created tag to assign each of the selected tags a weight of importance within the product catalog (Step 3900). This may be accomplished in this example by automatically assigning a rank to tags selected by the user. Each combination of tokens may be assigned a subsequent rank, with each ranked product representing a lower weight of importance in the product catalog than the one before. The user may then accept and update the ranking for the product, categories and catalog, possibly by clicking a button on the interface.

Figure 41:
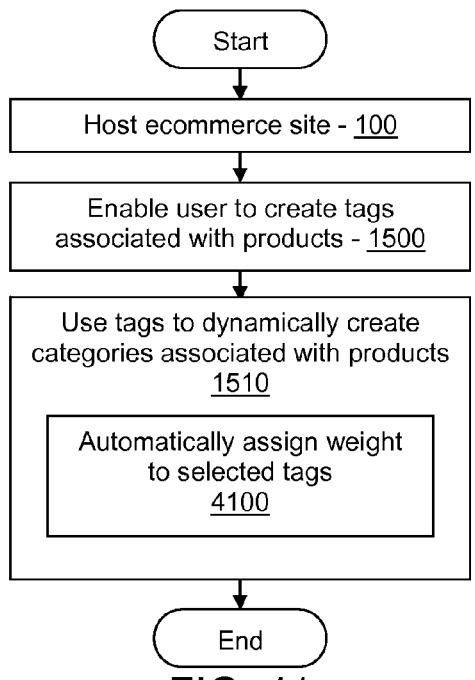
FIG. 41 is a flow diagram illustrating a possible embodiment including automatically assigning weight to selected tags.

An embodiment shown in FIG. 41 shows that the step of using the metadata tag to dynamically create a product category associated with the product (Step 1510) may include a step of automatically assigning of weight of importance within the product catalog for a plurality of tags selected from the created tag (Step 4100).

Figure 42:
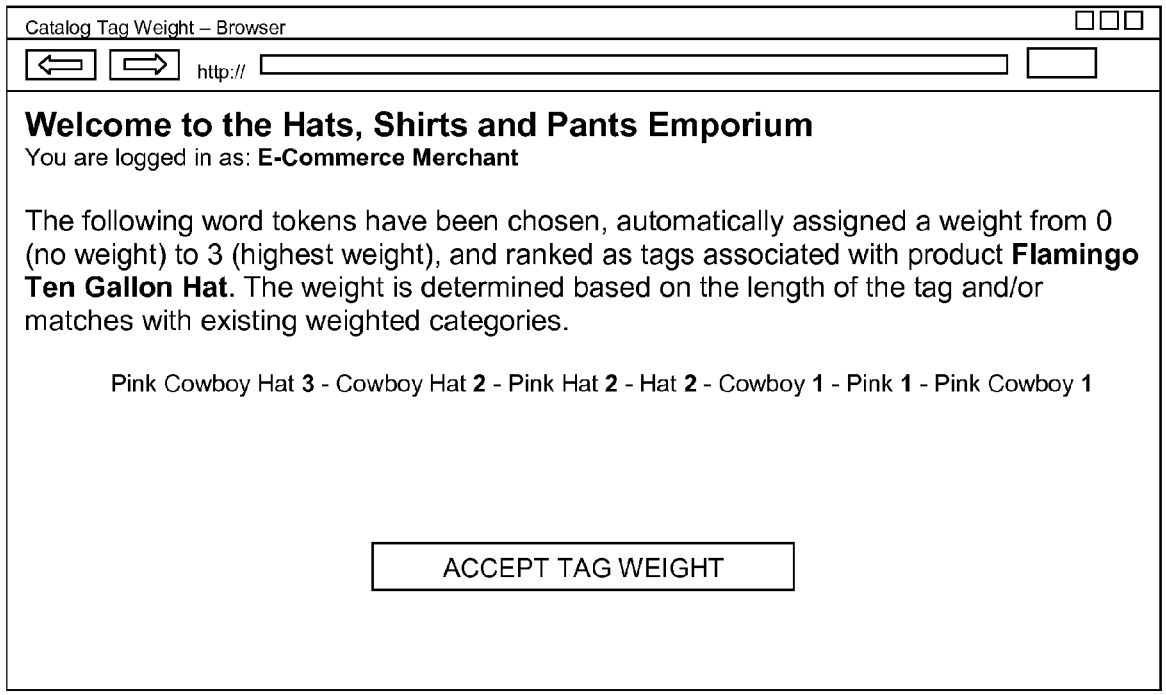
FIG. 42 illustrates a possible embodiment of an interface for automatically assigning weight to selected tags.

FIG. 42 shows an example user interface using the structure previously disclosed which may be used to automatically assign weights of importance within the product catalog for a plurality of tags selected from the created tag (Step 4100). This may be accomplished in this example by automatically assigning a weight to tags selected by the user. Each combination of tokens may be assigned a weight with a number next to the combinations of word tokens, with 3 possibly being assigned the highest weight and 0 being no weight.

Each combination of tokens may then be assigned weight and the user may then accept and update the weight for the tags and associated product, categories and catalog, possibly by clicking a button on the interface.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:
1. A method comprising the steps of:
  a) hosting an ecommerce site on a hosting computer communicatively coupled to a network;

b) receiving from a user a text string describing a product on the ecommerce site, the text string comprising one or more categories, one or more subcategories, one or more product features or any combination thereof;
c) dynamically creating, using a computer processor, a product category associated with the product, comprising the steps of:
   i. analyzing the text string and determining that the text string comprises multiple words;
   ii. parsing the text string into a plurality of word tokens; and
   iii. creating a plurality of candidate product categories using different combinations of words selected from the plurality of word tokens;
d) creating a user interface for the user to designate the product category from among the plurality of candidate product categories; and
e) receiving a selection from the plurality of candidate product categories from the user.

2. The method of claim 1 further comprising the step of accepting the product into a product catalog.

3. The method of claim 2 wherein the product catalog further comprises a product name for the product.

4. The method of claim 3 wherein the product catalog further comprises a product description for the product.

5. The method of claim 4 wherein the product name and product description further comprise a single word, a text string, a verbose text string or any combination thereof.

6. The method of claim 1 further comprising the step of receiving from the user input to define the one or more categories, the one or more subcategories, the one or more product features or any combination thereof.

7. The method of claim 6 wherein the one or more subcategories further define the one or more categories.

8. The method of claim 6 wherein the one or more product features further define the one or more categories.

9. The method of claim 7 wherein the one or more product features further define the one or more subcategories.

10. The method of claim 1 wherein the text string is selected by the user from one or more lists.

11. The method of claim 1 wherein the text string is input by the user into a text field.

12. The method of claim 8 further comprising the step of giving the product additional weight according to one or more additional subcategories, one or more additional product features or any combination thereof.

13. The method of claim 12 wherein the weight given to the product determines its importance in a product catalog.

14. The method of claim 13 wherein the weight given to the product is determined based on the number of words in the text string.

15. The method of claim 1 wherein the user is an ecommerce merchant.

16. The method of claim 1 wherein the user is an ecommerce product supplier.

* * * * *